United States Patent
Agarwal et al.

(10) Patent No.: US 10,380,266 B2
(45) Date of Patent: Aug. 13, 2019

(54) METHOD AND SYSTEM FOR ANALYZING DATA IN A DATABASE

(71) Applicant: InMobi PTE LTD., Singapore (SG)

(72) Inventors: Sharad Agarwal, Bangalore (IN); Jaideep Dhok, Bangalore (IN)

(73) Assignee: InMobi PTE Ltd., Singapore (SG)

( * ) Notice: Subject to any disclaimer, the term of this patent is extended or adjusted under 35 U.S.C. 154(b) by 792 days.

(21) Appl. No.: 14/823,615

(22) Filed: Aug. 11, 2015

(65) Prior Publication Data

US 2016/0042286 A1 Feb. 11, 2016

(30) Foreign Application Priority Data

Aug. 11, 2014 (IN) .......................... 3928/CHE/2014

(51) Int. Cl.
*G06F 17/30* (2006.01)
*G06N 5/02* (2006.01)
*G06Q 30/00* (2012.01)

(52) U.S. Cl.
CPC ............. *G06F 17/30* (2013.01); *G06N 5/025* (2013.01); *G06Q 30/00* (2013.01)

(58) Field of Classification Search
CPC ........ G06F 17/30; G06N 5/025; G06N 5/046; G06Q 30/00
USPC .......................................................... 706/50
See application file for complete search history.

(56) References Cited

U.S. PATENT DOCUMENTS 5,692,107 A * 11/1997 Simoudis ............... G06N 5/025
706/12
7,249,048 B1 7/2007 O'Flaherty
2013/0238548 A1 * 9/2013 George ............ G06F 17/30592
707/600

* cited by examiner

*Primary Examiner* — Dave Misir

(57) ABSTRACT

A method and system analyze data in a database. The method and system include defining a plurality of set of rules, wherein each set of rules corresponds to a predictive model, storing the each set of rules corresponding to the predictive model in a library as a user-defined function, and calling the user-defined function via a standard sequel language.

4 Claims, 3 Drawing Sheets

METHOD AND SYSTEM FOR ANALYZING DATA IN A DATABASE

FIELD OF THE INVENTION

The present invention relates to data analysis and in particular, it relates to analyzing data using predictive models.

BACKGROUND OF THE INVENTION

Predicting click-through rates is a massive-scale learning problem that is central to the multi-billion dollar online advertisement industry. The online advertising is become significant element for ad revenue generation. Choosing the right ads for the query and the order in which they are displayed greatly affects the probability that the user will see and click the advertisement. This ranking has a strong impact on the revenue the online advertising receives from the ads. For this reason, it is important to accurately estimate the click through rates of ads.

Traditionally, predictive analytics required a tedious process. A typical flow of activities involved in predictive analytics is identifying and extracting the data required from the sources such as an Enterprise Resource Planning (ERP) or a Customer Relationship Management (CRM) system or coming from the data warehouse. Different predictive analytic tools have different requirements on how to best process the data. For example, the data requires some transformation to fit the requirements of the predictive analytic tools so that analysis can take place successfully After the analysis, the noise in the data is removed and conclusions are drawn that lead to changes in for instance customer segmentation or product clustering. Further, success of analysis is monitored and the cycle starts all over.

The key assumption of the traditional predictive analytics process is that it is best to take data to the tools. Thus, this approach is costly, takes too much time, robs the process of its creativity and doesn't allow the number of experiments to scale.

In light of the above discussion, there is a need for a method and system, which overcomes all the above stated problems.

BRIEF DESCRIPTION OF THE INVENTION

The above-mentioned shortcomings, disadvantages and problems are addressed herein which will be understood by reading and understanding the following specification.

In various embodiments, the present invention provides a method for analyzing data in a database. The method includes defining a plurality of set of rules, wherein each set of rules corresponds to a predictive model, storing the each set of rules corresponding to the predictive model in a library as a user-defined function, and calling the user-defined function via a standard sequel language.

In another aspect, the present invention provides a system for analyzing data in the database. The system includes a rule definition module, a storage module, and a function-calling module. The rule definition module is configured to define a plurality of set of rules. The each set of rules correspond to predictive model. The storage module is configured to store the each set of rules corresponding to the predictive model in a library as a user defined function. The function calling module is configured to call the user defined function Systems and methods of varying scope are described herein. In addition to the aspects and advantages described in this summary, further aspects and advantages will become apparent by reference to the drawings and with reference to the detailed description that follows.

DETAILED DESCRIPTION OF THE INVENTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
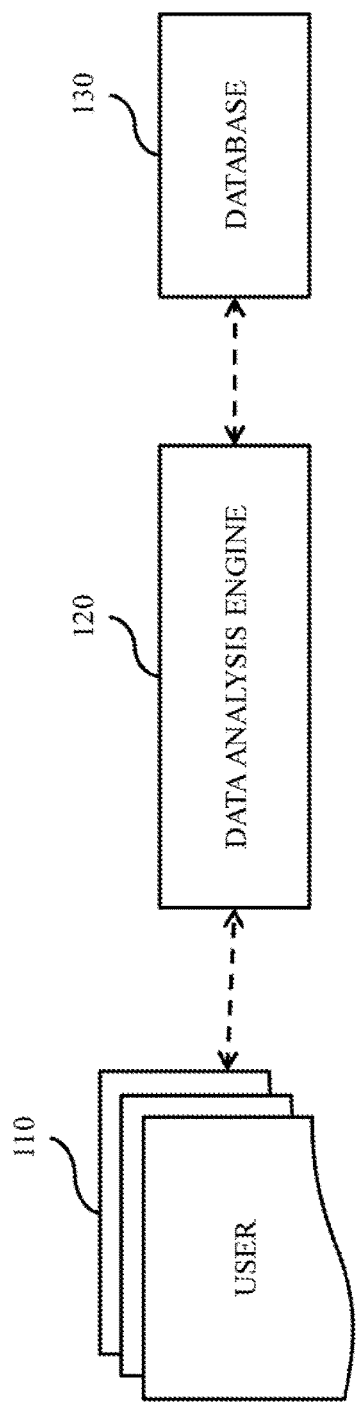
FIG. 1 illustrates a system for analyzing data in a database, in accordance with various embodiments of the present invention.

FIG. 1 illustrates a system 100 for analyzing data in a database 130. The system 100 includes a plurality of users 110, a data analysis engine 120, and the database 130.

The plurality of users 110 refers to any entity or a person that defines a set of rules. A rule can be a conjunction of a small number of simple statements. The set rules can be of simple form that can be easily interpreted, which can produce good predictive accuracy. Each set of rules defined by each user of the plurality of users 110 correspond to predictive model. The term used herein, "the predictive model" refers to a specific mathematical model obtained by applying a predictive method to a collection of data. The predictive models are learnt from historical data using data mining algorithms. For example, to build a predictive model for a target event type X, an event window preceding occurrences of X in the data stream $s_H$ is to be examined.

The data analysis engine 120 refers to data analysis software component that performs data analysis based on the each set of rules defined by the each user of the plurality of users 110. The data analysis engine 120 enables the implementation of the each set of rules defined by the each user. The each set of rules may be applied to historical process data to calculate the statistics and indicators. The term used herein, the "data analysis" is a process of collecting, organizing, examining, displaying and analyzing data using various features. The examples of various features are, but may not be limited to charts, graphs, figures, structures, tables and the like. The data analysis engine 120 may include the following function: processing data in order to draw inferences and conclusions, systematically apply statistical and logical techniques describe, summarize and compare data, and systematically study the data so that its meaning, structure, relationships and origin is properly understood.

The database 130 refers to any means of storing data in an organized manner.

Figure 2:
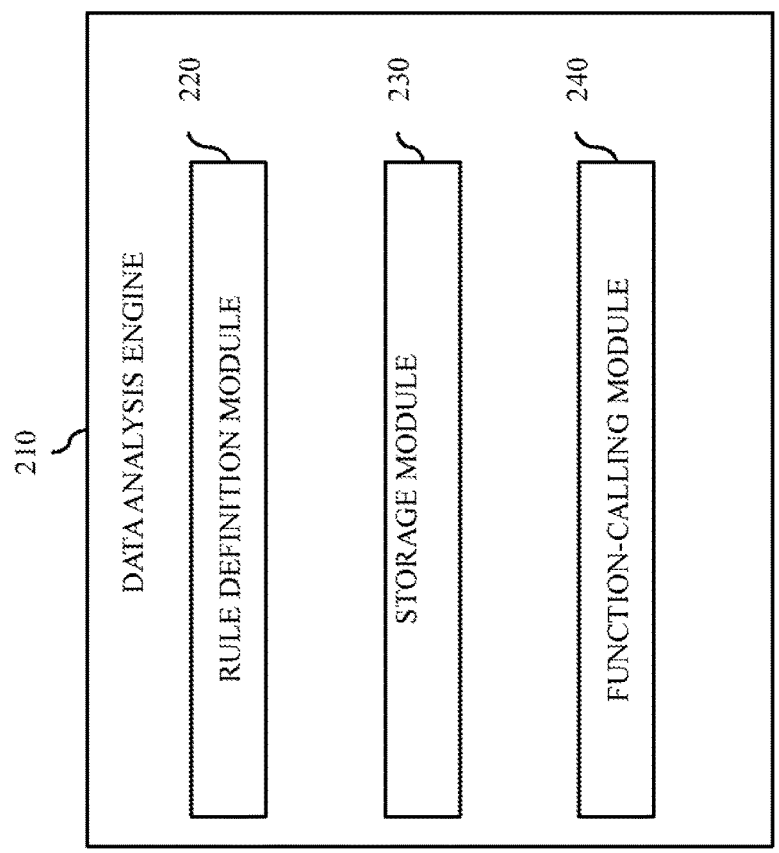
FIG. 2 illustrates a block diagram of a data analysis engine, in accordance with various embodiments of the present invention.

FIG. 2 illustrates a block diagram 200 of the data analysis engine 210 in accordance with various embodiments of the present invention. The data analysis engine 210 includes a rule definition module 220, a storage module 230, and a function-calling module 240.

The rule definition module 220 of the data analysis engine 210 allows the plurality of users 110 to define a plurality of set of rules. The each set of rules defined by the each user corresponds to a predictive model. The predictive model is built by considering training data set. The term used herein, the training data set is a set of data used to fit a model for predictive or classification of values that are known in the training data set, but unknown in other future data. The training data set includes multiple features that are taken as input parameters for building the predictive model.

For example, the input parameters are, but may not be limited to ad type (i.e., fashion accessories, gaming, clothing and the like), gender of the person viewing the ad male or female). Based on the above input parameters the predictive model is built to find the probability of clicking the ad.

The storage module 230 of the data analysis engine 210 stores the each set of rules that corresponds to the predictive model in a library. The each set of rules that corresponds to the predictive model is stored as a user-defined function (UDF) in the library. The term used herein, the user-defined function is a function that is defined by the user of the program at the time of writing the program.

The function-calling module 240 of the data analysis engine 210 invokes the user-defined function stored in the library of the storage module 230 to operate on one or more rows in the database 130. Once the predictive model is stored in the library, the predictive models turns into UDFs. These UDFs can then be invoked directly by the function-calling module 240 via a standard sequel language.

Figure 3:
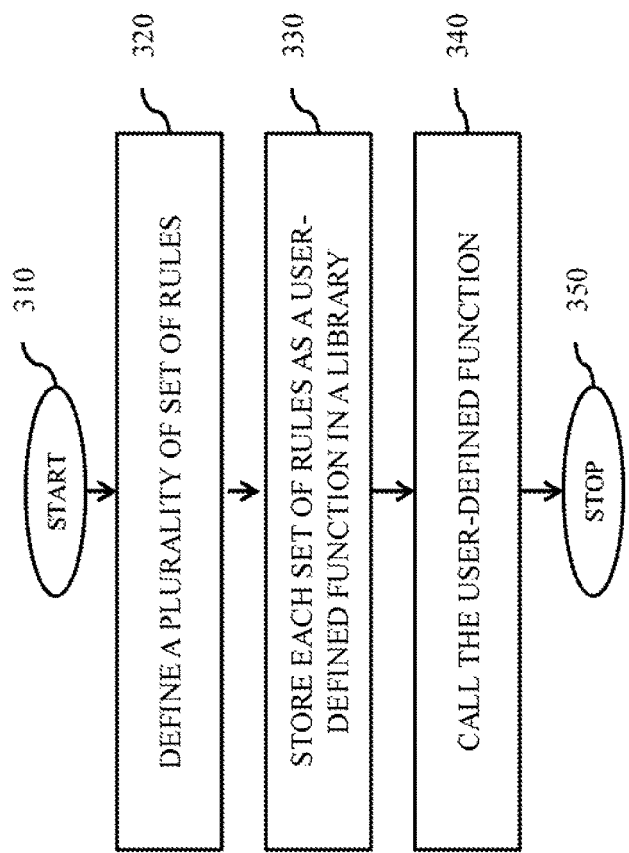
FIG. 3 illustrates a flowchart for analyzing data in the database, in accordance with various embodiments of the present invention.

FIG. 3 illustrates a flowchart 300 for analyzing data in the database 130, in accordance with various embodiments of the present invention. At step 310 the flowchart 300 initiates. At step 320 the data analysis engine 120 allows the plurality of users 110 to define the plurality of set of rules. The each set of rules corresponds to the predictive model. A step 330, the data analysis engine 120 the stores the each set of rules as user-defined function. At step 340, the data analysis engine 120 calls the user-defined function to analyze the data in the database 130. The each set of rules that correspond to predictive model are applied as UDF in database. The UDF is called via the standard sequel language. At step 350, the flowchart 300 terminates.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for analyzing data in a database, the method comprising:
    defining a plurality of set of rules, wherein each set of rules corresponds to a predictive model for predicting click-through rates for an advertisement;
    storing the each set of rules corresponding to the predictive model in a library, wherein the each set of rules corresponding to the predictive model is stored as a user-defined function in the library;
    building the predictive model using a training data set, wherein the training data set includes multiple features used as input parameters to train the predictive model for classification of values to find a probability of a user clicking on the advertisement;
    calling the user-defined function in a database query, wherein the user-defined function is called to analyze the data in the database;
    invoking the user-defined function to operate on one or more rows in the database directly from a function-calling module to analyze the data in the database in accordance with the predictive model;
    processing the data responsive to the database query with the user-defined function to generate an output responsive to the user-defined function that indicates the probability of the user clicking on the advertisement; and
    providing the output.

2. The method as claimed in claim 1, wherein the user-defined function is called via a standard sequel language.

3. A system for analyzing data in a database, the system comprising:
    a processor; and
    a memory, coupled to the processor, that includes code modules stored therein that are executable by the processor, wherein the code modules include:
    a rule definition module, wherein the rule definition module is configured to define a plurality of set of rules, wherein each set of rules corresponds to a predictive model for predicting click-through rates for an advertisement;
    a storage module, wherein the storage module is configured to store the each set of rules corresponding to the predictive model in a library as a user-defined function;
    a predictive model building module configured to build the predictive model using a training data set, wherein the training data set includes multiple features used as input parameters to train the predictive model for classification of values to find a probability of a user clicking on the advertisement;
    a function-calling module, wherein the function-calling module is configured to call the user defined function in a database query, wherein the user-defined function is called to analyze the data in the database;
    an invoking module configured to invoke the user-defined function to operate on one or more rows in the database directly from a function-calling module to analyze the data in the database in accordance with the predictive model;
    a processing module configured to process the data responsive to the database query with the user-defined function to generate an output responsive to the user-defined function that indicates the probability of the user clicking on the advertisement; and
    an output module configured to providing the output.

4. The system as claimed in claim 3, wherein the function-calling module calls the user defined function via a standard sequel language.

* * * * *